J. A. CHARTER.
MOTOR VEHICLE.
APPLICATION FILED MAY 3, 1907.
941,129.
Patented Nov. 23, 1909.
3 SHEETS—SHEET 2.
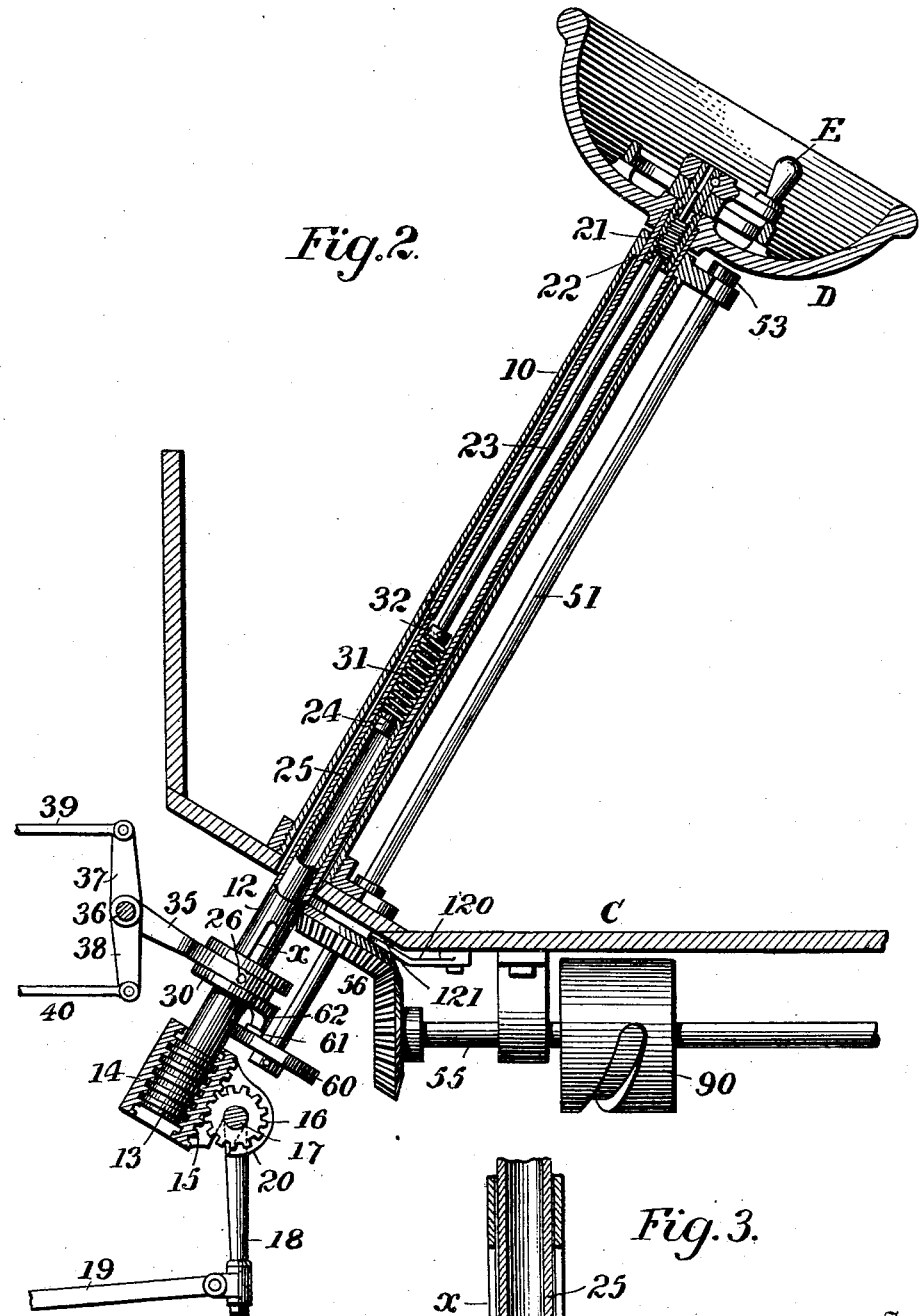
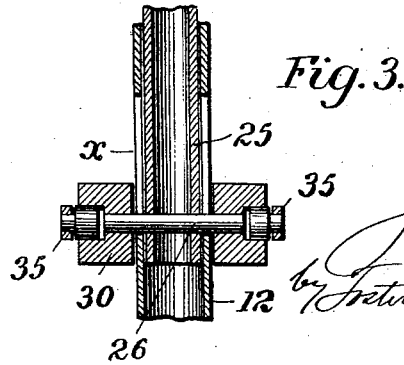
Witnesses
Inventor
James A. Charter
by Foster Freeman Watson & Coit
Attorneys

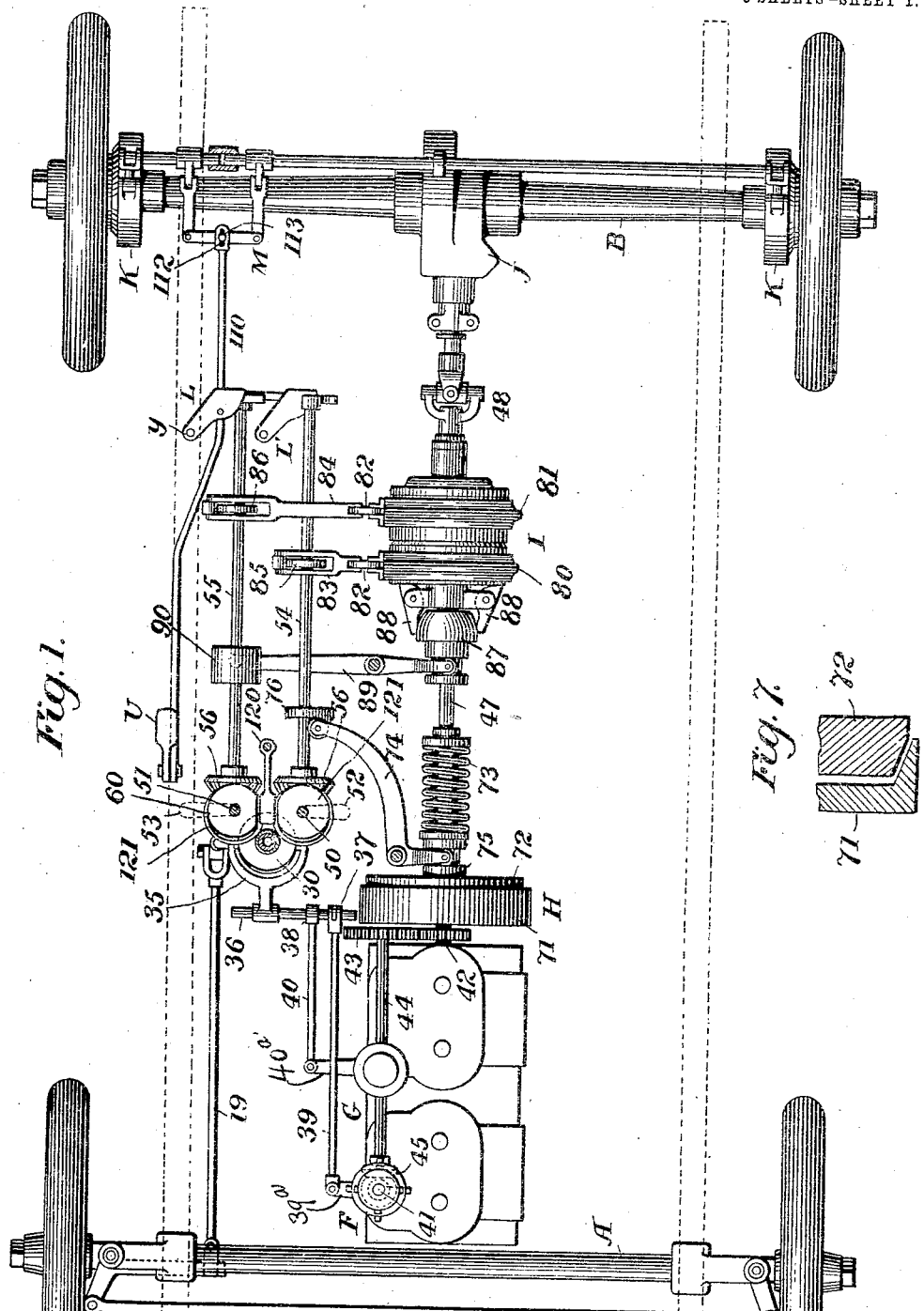

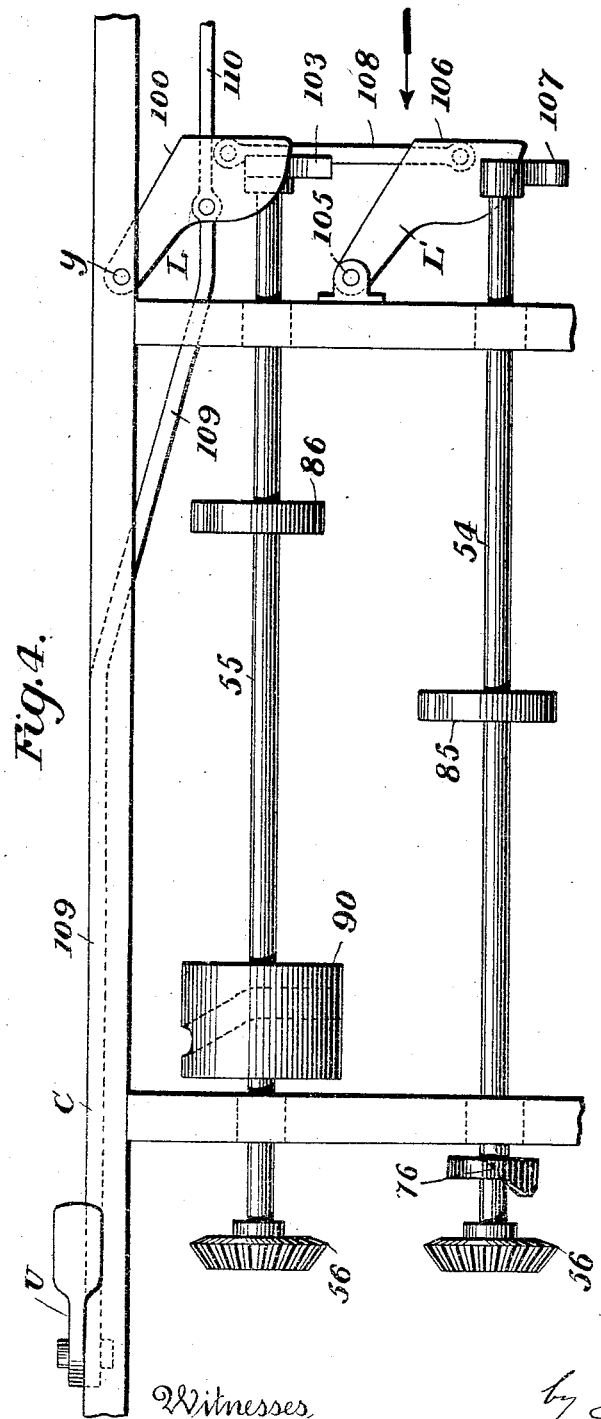
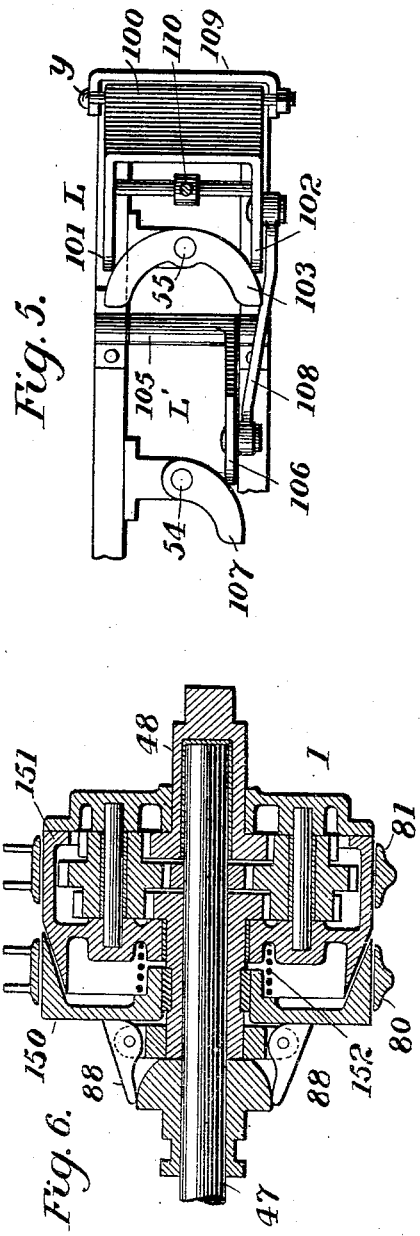

UNITED STATES PATENT OFFICE.

JAMES ADAMS CHARTER, OF CHICAGO, ILLINOIS.

MOTOR-VEHICLE.

941,129.     Specification of Letters Patent.     Patented Nov. 23, 1909.

Application filed May 3, 1907. Serial No. 371,668.

*To all whom it may concern:*

Be it known that I, JAMES A. CHARTER, a citizen of the United States, and resident of Chicago, county of Cook, State of Illinois, have invented certain new and useful Improvements in Motor-Vehicles, of which the following is a specification.

My invention relates to motor vehicles and more especially to that class of motor vehicles in which internal combustion engines are employed, and consists in certain details of construction which facilitate the varying of the amount of energy applied to drive the vehicle and change the speed, as fully set forth and as illustrated in the accompanying drawings, in which—

Figure 1 is a plan view in part section showing the running gear and motor connections; Fig. 2 is an enlarged sectional elevation of the parts connected with the steering post; Fig. 3 is a detail of the lower part of the steering post in longitudinal section; Fig. 4 is an enlarged plan of the counter-shafts and connections used in co-action with the speed changing gear; Fig. 5 is an end view of Fig. 4 looking in the direction of the arrow in said figure; Fig. 6 is a section of the speed changing gear, and Fig. 7 is a section of the clutch.

The car is provided with front and rear axles A and B, which suitably support the frame and body C, the front wheels swinging upon the front axle, as usual, under the control of a steering wheel D carried by a hollow post 10, and connected with a hollow steering shaft 12, having a threaded lower end 13 adapted to the threads of a sliding collar 14, which is provided with a rack 15 The rack of the collar 14 engages a pinion 16 upon the steering shaft 17, an arm 18 of which is connected by a link 19 with one of the swinging knuckles of the steering gear. The collar 14 may thus be raised and lowered by turning the steering wheel, movement thus being imparted to the said knuckles and wheels. Any suitable means may be employed for guiding the collar and preventing it from turning, but as shown it is provided with slotted ears 20, the slots in which receive the shaft 17.

In order to regulate the action of the "timer" so as to advance and retard the spark I make use of devices controlled by a lever or other hand controlled device E which, as shown, is connected with a bushing or sleeve 21 extending into the hollow steering shaft 12 and provided with internal threads to receive the threaded enlargement 22 of a rod constituting one of two shaft sections 23, 25, which rod 23 extends downward through the steering shaft and through an opening in the head of the hollow shaft section 25. A pin 26 (Fig. 3) extends from the shaft 25 through slots $x$ in the steering shaft and into a cam collar 30, and at the lower end of the rod 23 is a head 24 which is normally maintained against the head of the hollow shaft 25 by a spring 31 which bears against a collar 32 on the rod 23. As thus constructed, the swinging of the hand lever or device E in one direction or the other will raise or lower the cam collar 30, and, through any suitable appliances, this action may be made the means of shifting the timer and also of shifting regulating means varying the flow of the mixed gases through or from the carbureter.

Any suitable means may be employed for transmitting motion from the collar 30 to the timing and carbureting appliances. As shown, the collar 30 has an annular groove for receiving studs extending from the forks of a lever 35 upon a shaft 36, and from the latter, either in the same direction or in opposite directions, extend arms 37 and 38, the former connected with a rod 39 extending to the regulating arm 39ª of the timer F and the latter with a rod 40 extending to the regulating arm 40ª of the carbureter G. The timer F and the carbureter G may be constructed in any usual or suitable manner, and the movement of the rod 40 may serve in any suitable way to vary the flow of the mixed gases or control the mixture, and I therefore do not attempt to illustrate any detailed construction of timing and carbureting devices and appliances, and will refer for one character of devices which may be employed to Letters Patent granted to me August 20, 1904, No. 766,218. In the present construction the shaft 41 of the timing device is driven from the engine shaft 42 through two-to-one-gears 43, counter-shaft 44 and bevel gears 45, so as to secure a two-to-one rotation between the two shafts 42—44.

The engine shaft 42 may be thrown into and out of connection with the section 47 of the driving shaft by means of a clutch device H of any suitable character, which, while not used for ordinary driving, is a convenient means of totally disconnecting the engine, and the section 47 of the driving shaft may be connected with the other section 48 through the medium of reversing gear appliances I of any suitable construction, the section 48 gearing with a suitable compensating gear within the casing J for driving the sections of the rear axle in any usual or suitable manner.

Upon the steering post 10 are bearings for two parallel shafts 50—51 provided with handles 52 and 53, which shafts are geared in any suitable manner to operate a rock shaft or rock shafts, from which the change speed gear is operated. As shown, there are two rock shafts, 54, 55, and a pair of bevel gears 56 transmit motion from the shaft 50 to the rock shaft 54 (Fig. 2) and similar bevel gears transmit motion from the shaft 51 to the rock shaft 55, and a cam 60 at the lower end of the shaft 51 has a lug 61 which may be carried into and out of contact with a lug 62 upon the cam collar 30 to raise and lower the latter, for the purpose set forth hereinafter, the lug 61 being of sufficient length to contact with the lug 62 in different positions of the steering shaft.

The clutch device H is operated from one of the shafts, as the shaft 54, in any suitable manner. As shown, the said device consists of a wheel 71 having an interior bevel face adapted to the exterior bevel face of a clutch disk 72 which can slide on and turn with the shaft section 47, and a spring 73 bearing upon a collar on the shaft 47 tends to throw forward the disk 72 to carry the same into engagement with the wheel 71.

A lever 74 may be rocked from the shaft 54 so as to carry the disk 72 into and out of frictional engagement with the wheel 71. As shown, the disk 72 is in engagement with the wheel 71 and the lever 74 has a forked arm with anti-friction lugs engaging an annular recess in the hub 75 of the disk 72, and at the other end of the lever 74 is an antifriction roller bearing upon the face of a cam 76 on the shaft 54, the turning of which in the left hand direction, therefore, may be the means of suitably swinging the lever 74 and sliding the disk 72 away from the wheel 71.

The speed changing and reversing gear may be of any suitable character, and between the same and the shaft or shafts are any suitable connections or appliances, whereby, when the said shaft or shafts are in neutral or mid-position, there will be no driving connection between the driving shaft and the wheels, and the reversing gear will be also in neutral position. As these devices and appliances may be differently constructed, I have not attempted to illustrate any special construction in full detail, but as shown the common or well-known planetary change gear which has disks 150, 151, to which clamping bands 80, 81 may be applied through the medium of levers 82 and links 83, 84, the former carrying a roller acted upon by the cam 85 on the shaft 54 gives the reverse action, and the link 84 carries a roller acted upon by the cam 86 on the shaft 55 and gives the slow speed ahead, while the high speed direct drive action is secured by the sliding upon the shaft 47 of a sleeve 87 having a cone end acting on dogs 88 to slide the disk 150 into engagement with the disk 151 and against the action of a spring 152, the said sleeve 87 being moved back and forth by a forked lever 89 actuated by a grooved cam 90 upon the shaft 55. As I do not claim the broad construction of these devices it is not necessary to further illustrate them in detail.

It is important that the speed changing devices should be in neutral position when the brake is applied, and I therefore provide means whereby on the movement of the brake lever or pedal U to apply the brakes K, K, of any suitable construction, a detent in two sections L, L' will be carried into position to hold either of the shafts 54, 55 in their central or neutral position or carry them into such position that the high speed or slow speed ahead is cut out by shaft 55 and the reversing gear is also cut out by shaft 54, in case it is not in mid-position when the brake is applied. Such detent sections L, L' may be constructed in different ways, but as shown, swinging frames 100, 106 are suitably pivoted to the frame of the apparatus at $y$ and 105 (Figs. 1, 4 and 5) and the frame 100 is provided with two fingers 101, 102, and the shaft 55 has a crosshead 103 in the form of two curved arms projecting in opposite directions, and these parts are so arranged that when the detent is swung to the position shown in Fig. 5, on the application of pressure to the brake the detent section L will contact with the crosshead 103 and prevent any other movement of the parts, or if the cross-head 103 is out of the neutral position shown in Fig. 5 and the section L is then swung inward, one of the fingers will bear upon the nearest end of the crosshead, and by contact therewith will swing it and its shaft to neutral position, thereby also carrying the change gear on that shaft to neutral position.

The section L' is preferably in the form of an arm 106, projecting from a rock shaft 105 in position to make contact with a curved arm 107 on the shaft 54, when said shaft is in neutral position, and the two sections L, L' of the detent are connected by a link 108 so as to swing together, the rocking of the shaft 54 serving as a means of carrying to neutral position the mechanism operating the reverse band on the planetary transmission when the brake is applied, as well as the forward speeds, as above described.

Any suitable connections may be made between the single or double detent and the brake element U. As shown, there is a connecting rod 109 connected to the brake element U and also to a pin on the section L, and a link 110 may form part of the rod 109 or may be pivoted to the section L, and may be connected to any suitable equalizing device M (Fig. 1) through which movement is imparted to the brakes K, K. Preferably the detent should have a limited movement prior to applying the brakes, and this may be secured by providing some means for a lost motion at the proper point, as for instance, by providing the link 110 with an elongated slot 112 receiving a pin 113 on the part of the equalizing device to which it is connected.

By the construction above described I am enabled to simplify and reduce the cost of construction of the necessary adjusting means of a motor driven car, and among the advantages that pertain to my improved construction I point out that it is practicable to control the speed of the engine by means of a hand controlled device upon the steering post so as to change the speed from a minimum to a maximum, and that this can be done in connection with any adjustment of the speed gear so that a desired variation of speed may be obtained with a speed gear having but two forward speeds, the vehicle being first started in motion and the high speed thrown into action and any desired variation being then secured by the adjustment of the devices controlling the timer and carbureter, and thus, if so desired, propel the car with a positive high speed direct drive at a speed less than the ordinary speed of the changing gear of the usual constructions. It will further be seen that the desired changes may be made with comparatively few parts so that there is little opportunity for the driver to become confused in the shifting of the different devices. It will further be seen that by the described construction the engine is prevented from racing when disengaged from the car, inasmuch as upon rocking the shaft 54 to effect this disengagement the devices which thus rock the shaft serve further to shift the sparker and carbureter control means so that no such racing may occur. Thus, in the construction shown, the cam collar 30, when in a position to slightly slow down the engine, may be lifted somewhat higher by turning the shaft 51 so as to bring the lugs 61 and 62 into engagement, thereby lifting the lower shaft section 25 independently of the upper section 23 and adjusting the timer and carbureter control devices to their slow speed points. It will be seen, however, that the collar can be carried still higher by turning the handle E which brings the head 24 of the shaft 23 against the end of the hollow shaft 25, and that this does not affect the movement which may be imparted to the collar by the contact of the lugs 61, 62, as, in case the control is left in a lower position, the collar may then be lifted so that the closed end of the hollow shaft 25 is carried away from the head 24 at the end of the shaft 23. It will be further seen that upon the forward movement of the brake device, the swinging of the detents will instantly result (whatever may be the speed or the position of the speed changing gears) in disconnecting the clutch mechanism and at the same time retard the spark and close the throttle, and the further movement of the brake lever will then bring all the parts to their neutral position, setting the brake. If the brake is a lock brake of ordinary type, with a ratchet dog and quadrant, it will be seen that when applied in connection with the above device it will be impossible to shift the parts and start the apparatus.

In order to prevent shifting of the clutches in the particular embodiment of the invention illustrated, the members 103 and 107 are provided on the shafts 54 and 55. These members are locked or prevented from moving by the detent members 100 and 106, and while in the positions to which they are moved when the brake is operative, prevent any movement of the clutches or adjustment of the speed changing gear. Also it will be seen that any adjustment of the regulating devices necessary to increase the speed of the engine is prevented at such times by the cam 60, which is held in its central position through the action of the gears 56, and is provided with a lug 61 co-acting with the lug 62 to raise and hold the collar 30 in such position that the timing device and carbureter are adjusted to impart a slow or retarded movement to the engine and its shaft. In order to prevent operating the shafts 50 and 51 simultaneously after the brake has been released from its locked position shown in Fig. 1, I make use of a safety device in the form of a dog 120 suitably supported to extend between contiguous disks 121 upon said shafts; which disks have flattened faces. The dog 120 is of such thickness that it may be swung to one side on turning either shaft and is carried to the flattened face of the other shaft, but if any attempt is made to turn both shafts at once, or one shaft after the other has been turned, the disk or disks will jam against the dog, which will thus prevent such improper movement.

While I have illustrated the steering post as hollow and provided with a hollow shaft, it will be evident that these features may be changed while still making use of a sliding collar and connections with the carbureter and timer, and while I have shown two shafts 54, 55, and operating means, it will be evident that some of the features of my invention may be used in connection with a single counter-shaft.

Without limiting myself to the precise construction and arrangement of parts shown, I claim as my invention:

1. The combination in a motor vehicle and with the steering gear, of the steering shaft, a cam collar thereon, a shaft mounted on the steering shaft provided with a handle at the upper end and at the lower end with a cam engaging the collar for shifting said collar longitudinally of the shaft, timing and carbureting means and regulating devices therefor, and connections between the said collar and said devices.

2. The combination of the hollow steering shaft, timer, carbureter and regulating devices therefor, a sliding collar on the shaft connected with said devices, a controller at the head of the shaft, shaft sections 23, 25 intermediate the controller and the collar, a spring between said sections, and means for raising and lowering the lower shaft section and collar independently of the upper shaft section.

3. The combination in a motor vehicle and with a steering gear, of a hollow steering shaft, a collar thereon, means for sliding the collar on the said shaft including connections within the said shaft, a timer, a carbureter and regulating means therefor, a rock-shaft provided with a plurality of arms, connections between one of the arms and the timer, connections between another arm and the carbureter regulating means, the third arm being forked to engage the sliding collar, as set forth.

4. The combination with a vehicle of a motor, driving shaft, engine shaft and clutch device and speed changing gears and steering gear, and two parallel rock shafts, and connections between the latter and the clutch device and speed changing gear, and means whereby the movement of either shaft is prevented after that of the other is begun.

5. The combination in a motor vehicle, of a motor, driving shaft, engine shaft, clutch device and speed changing gear and steering gear, two parallel rock shafts and connections between the same and the speed changing gear and clutch device, a steering post and hand operated shafts upon said post connected to rock the rock shafts, contiguous disks with flattened sides upon said hand operated shafts, and a dog swinging between said disks and proportioned to prevent the movement of either hand operated shaft after that of the other is begun.

6. The combination in a motor vehicle, of a motor, parallel rock shafts, speed changing and reversing gears and clutch device and connections between said shafts and said gears and device, of steering gear, a steering post and hand operated shafts thereon, and gearing between the said hand shafts and the rock shafts.

7. The combination in a motor vehicle, of a motor, steering post, steering gear and shafts 50 and 51, speed changing gears, parallel shafts 54 and 55 and connections between the same and the shafts 50, 51, clutch device and reversing gear, and connections between the parallel shafts 54 and 55 and the said clutch device and gears.

8. The combination in a motor vehicle, of a motor, speed changing gears, a rock shaft and connections between the same and said gears, a detent for holding the rock shaft in neutral position, a brake, a brake lever, and connections between the latter and said detent.

9. The combination in a motor vehicle, of a motor, speed changing gear and steering gear, a rock shaft and connections between the same and said speed changing gear, a contact piece upon the said rock shaft, a detent adapted to engage said contact piece and carry the shaft to its neutral position, a brake and a brake lever and connections between the brake lever and the said detent.

10. The combination in a motor vehicle, of a motor, speed changing gear, a rock shaft and connections between the same and said gear, a contact piece upon the said rock shaft, a detent adapted to engage said contact piece and carry the shaft to its neutral position, a brake lever and connections between the brake lever and the said detent, and brake devices and connections between the latter and the lever.

11. The combination in a motor vehicle, of a motor, speed changing gear, a rock shaft and connections between the same and said gear, a contact piece upon the said rock shaft, a detent adapted to engage said contact piece and carry the shaft to its neutral position, a brake lever, connections between the brake lever and the said detent, and brake devices and connections between the latter and the lever, said connections constructed to permit a limited lost movement.

12. The combination in a motor vehicle, with a motor, speed changing and reversing gears and clutch device, of parallel shafts and connections for operating therefrom the said speed changing and reversing gears, and clutch device and detents and a brake, a brake lever connected therewith, and engaging devices upon said shafts arranged to contact with said detents when the brake is applied when the parts are in neutral position.

13. The combination in a motor vehicle, of a motor, change speed gears, shaft 55 and connections between said shaft and said speed gears, and a cross head on said shaft, a detent movable to and from said cross head and provided with fingers to engage the same, a brake, a brake lever and connections between the latter and the detent, for the purpose set forth.

14. The combination in a motor vehicle, of a motor, speed changing and reversing gears, the shafts 54 and 55 and connections with said gears, a brake, a brake lever, a cross-head on the shaft 55 and an arm on the shaft 54, and detents engaging said cross-head and arm and connections between the brake operating means and said detents, for the purpose set forth.

In testimony whereof I affix my signature in presence of two witnesses.

JAMES ADAMS CHARTER.

Witnesses:
O. A. REED,
P. H. ARDEN.